May 9, 1939.  G. L. MOSES  2,157,859
CONTROL SYSTEM FOR TROLLEY FROGS
Filed Aug. 26, 1936
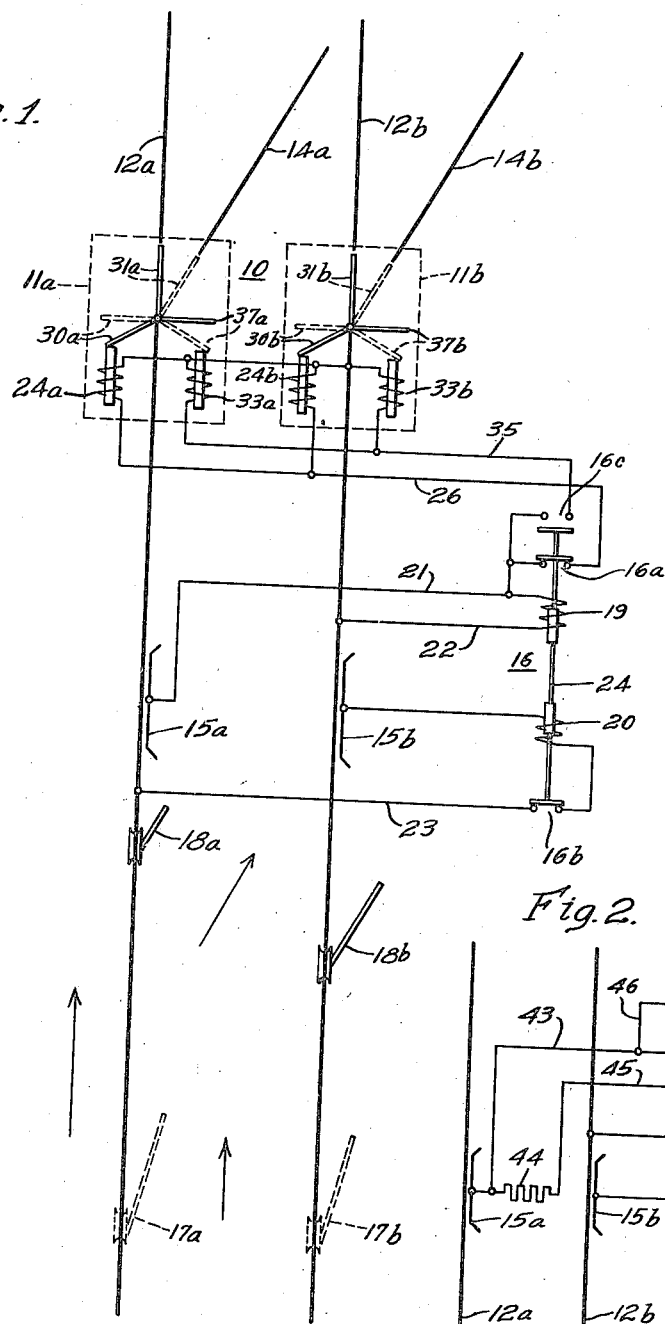
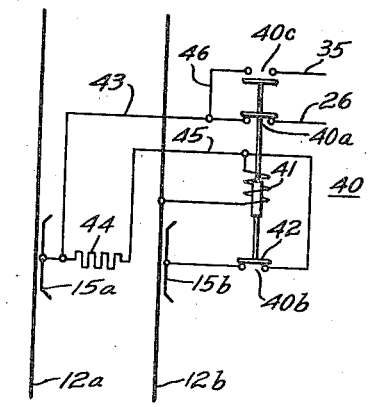
WITNESSES:
C. J. Weller.
F. Giolma
INVENTOR
Graham L. Moses.
BY
ATTORNEY

UNITED STATES PATENT OFFICE 2,157,859

CONTROL SYSTEM FOR TROLLEY FROGS

Graham L. Moses, Pittsburgh, Pa., assignor to Westinghouse Electric & Manufacturing Company, East Pittsburgh, Pa., a corporation of Pennsylvania Application August 26, 1936, Serial No. 97,941

8 Claims. (Cl. 191—38)

My invention relates, generally, to trolley bus overhead systems, and it has reference, in particular, to automatic control systems for electrically-operated trolley frogs in a turn-out for a trolley bus overhead.

In trolley bus systems, when it is desired to provide a turn-out in the line, it is necessary to have some positive switching device in the overhead conductor. Trolley buses cannot rely upon the current collectors trailing through the trolley frog, as is the case with street cars, where a track switch is used and the vehicle is already following a definite path when the current collector reaches the point of diversion. Instead, some form of electrically-operated trolley frog is used in the overhead system, such as disclosed in Patent No. 2,020,924 to N. A. Wahlberg et al., dated November 12, 1935.

To operate such a mechanism it has heretofore generally been the custom to use the "power-off, power-on" method of control. That is, as the trolley bus approaches the turn-out, the operator is required to place his controller in either the "off" or "on" position, depending on which way he desires the bus to proceed. In the usual method of control, when the operator desires that a bus should proceed in the "through" direction, he must place the handle of the controller in the "off" position as the current collector passes an auxiliary contact situated in the trolley line ahead of the turn-out. If he desires to make a turn, he must place the handle of the controller in the "on" position when approaching the auxiliary contact.

Another system of trolley frog operation utilizes biased contacts. This system depends upon the natural skew of the two current collectors, when the trolley bus proceeds at an angle from a main line, to complete a circuit through a pair of auxiliary contacts placed in a skewed position on the overhead and cause energization of the necessary coils in the trolley frog mechanism to throw the trolley frog to the turn-out position. If the bus is proceeding in the "through" direction, the current collectors will approach the intersection in line, and complete a circuit through a pair of oppositely positioned auxiliary contacts on the overhead to energize the coils in the trolley frog mechanism to throw the trolley frog to the "through" position.

There are decided disadvantages to these systems of trolley frog operation. If, in the "power-off, power-on" system of operation there should be, at the time of approach to a turn-out, any obstruction in the bus' path, such as caused by automobile traffic, it is exceedingly difficult for the operator to direct his bus, and at the same time maintain the controller in the "off" position, should he desire to proceed on the "through" line. Similarly, if the operator should desire to make the turn, and traffic is particularly heavy, it is often extremely difficult, on account of frequent stoppages, to maintain the controller in the "on" position at the time of passing the overhead auxiliary contacts. The added distraction of having to maintain the controller in one or the other of these two positions depending on which direction the bus is to turn, is a hazard to the safety and comfort of the passengers, as the driver is unable to devote his full attention to the handling of the bus.

The biased contact method is an improvement over the "power-off, power-on" method of trolley frog operation, but it requires the use of a multiplicity of auxiliary contacts, and their effective length is limited by the permissible skew of the current collectors, hence increasing the hazard of faulty operation of the trolley frog mechanism.

It is, therefore, an object of my invention to provide for the selective operation of electric trolley frogs dependent upon the position of a trolley bus relative to the trolley wire.

Another object of my invention is to provide for the selective operation of electric trolley frogs dependent upon the angle of approach of a pair of current collectors to a pair of oppositely positioned stationary auxiliary contacts.

A further object of my invention is to provide for the operation of trolley frogs dependent alone upon the angle of approach of a pair of current collectors.

A still further object of my invention is to provide for the selective operation of a pair of trolley frogs independent of whether the approaching current collectors are drawing power or not.

Still another object of my invention is to provide simple means for the selective operation of trolley frogs without the operator of a trolley bus having to maintain the controller in any predetermined position.

A still further object of my invention is to provide relay controlling means in conjunction with a pair of oppositely positioned auxiliary line contacts to secure selective operation of trolley frogs in a turn-out dependent on the direction in which the bus is proceeding.

Other objects of my invention will, in part, be obvious and, in part, appear hereinafter.

My invention, accordingly, is disclosed in the embodiment hereof shown in the accompanying drawing, and comprises the features of construction, combination of elements, and arrangement of parts, which will be exemplified in the construction hereinafter set forth, and in the scope of the application, which will be indicated in the appended claims.

For a more complete understanding of the nature and scope of my invention, reference may be had to the following detailed description, taken in connection with the accompanying drawing, in which:

Figure 1 is a diagrammatic view of a control system for an electrically-operated trolley frog embodying the principal features of my invention, and Fig. 2 is a diagrammatic view of a modification of the system shown in Fig. 1.

In a preferred form of my invention, the operation of a pair of electrically-operated trolley frogs, in a trolley bus overhead system, is controlled by means of a differentially wound solenoid relay, which is, in turn, energized from a pair of oppositely positioned stationary auxiliary contact members mounted, one adjacent to each line of the overhead preceding the turn-out. These contact members are disposed to be energized upon passage of the current collectors, and depending upon the horizontal angle of approach of the two current collectors to these auxiliary contact members, that is, whether the contact members are energized at substantially the same time or one ahead of the other, the differentially wound relay will operate to energize the trolley frog operating coils and throw the trolley frog to either the "through" or "turn-out" position, in accordance with the angle of procedure of the trolley bus relative to the line of the trolley wire when the current collectors engage the auxiliary contact members.

Referring particularly to Figure 1 of the drawing, the reference numeral 10 designates, generally, a turn-out in a trolley bus overhead system comprising a pair of electrically-operated trolley frogs 11a and 11b, a pair of "through" conductors 12a and 12b, a pair of intersecting conductors 14a and 14b, a pair of oppositely positioned auxiliary contact members 15a and 15b, secured to, but separate from, the conductors 12a and 12b respectively, ahead of the turn-out, and a control relay 16.

The approaching current collectors 17a and 17b, shown dotted, represent the current collectors of a trolley bus which is proceeding in the "through" direction, both current collectors being in line. The current collectors 18a and 18b, shown in full lines, may represent the current collectors of a trolley bus which is preparing to make a turn-out to the right, the left-hand current collector 18a, therefore, being in advance of the right-hand current collector 18b.

In the case of a trolley bus proceeding in the "through" direction, the oppositely positioned auxiliary contact members 15a and 15b are energized at the same time, when the current collectors 17a and 17b traverse them respectively. When the auxiliary contact members 15a and 15b are energized, they in turn energize the operating coils 19 and 20 of the control relay 16, through contact members 15a, conductor 21, coil 19, and conductor 22 to line 12b; and contact member 15b, coil 20, normally closed contact member 16b and conductor 23 to line 12a, respectively. Coils 19 and 20 are wound in opposition, and when both are energized at the same time, their fluxes tend to neutralize each other so there is no pull on the armature 24 of the control relay 16, and the relay tends to remain in the deenergized position as shown. Under this condition, the "through" coils 24a and 24b of the trolley frogs 11a and 11b are energized from the auxiliary contact member 15a through conductor 21, the normally closed contact members 16a of the control relay 16, conductor 26, the "through" coils 24a and 24b and back to the conductor 12b. The armatures 30a and 30b of the trolley frogs 11a and 11b are then actuated and the frog members 31a and 31b are positioned to guide current collectors in the "through" position.

In case the operator desires to make a turn-out, the current collectors 18a and 18b will be, as shown in full lines in the drawing, skewed, and the current collector 18a will make contact with the auxiliary contact member 15a before the current collector 18b makes contact with the auxiliary contact member 15b. As the current collector 18a engages with the auxiliary contact member 15a, the operating coil 19 only of the control relay 16 is energized which causes the relay armature 24 to be actuated against the force of gravity or any suitable biasing means to open its normally closed contact members 16a and 16b, and close its normally open contact members 16c, thus energizing the "turn" coils 33a and 33b of the trolley frogs 11a and 11b. The energizing circuit for the "turn" coils 33a and 33b extends from the auxiliary contact member 15a through conductor 21, the normally open contact members 16c, conductor 35, "turn" coils 33a and 33b, and thus to conductor 12b. Under these conditions, the armatures 37a and 37b of the trolley frogs 11a and 11b are actuated to throw the trolley frog members 31a and 31b to the turn position as shown in dotted outline. The armature 24 may return by gravity to the deenergized position when the operating coil 19 is deenergized by disengagement of the current collector from the auxiliary contact member 15a, and the trolley frog members 31a and 31b may be held in the operative position in any suitable manner, such for example, as by the use of locking coils, as shown in the aforementioned Wahlberg Patent 2,020,924.

It may be seen that though the current collector 18b will traverse the contact member 15b no operation of the frog can result since the frog mechanism is energized from the 15a contact only.

Referring to Fig. 2 of the drawing, the reference numeral 40 denotes generally a control relay which may have a single operating coil 41 operable when energized to actuate the armature 42, opening the normally closed contacts 40a and 40b, and closing the normally open contacts 40c.

Upon the approach of a trolley bus about to proceed in the "through" direction, both auxiliary contact members 15a and 15b will be energized simultaneously as the current collectors traverse them. Under these conditions the coil 41 is shunted by the normally closed contact member 40b and is inoperative. The "through" operating coils of the trolley frogs are then energized from auxiliary contact member 15a, through conductor 43, normally closed contact members 40a, conductor 26, and as for the "through" condition in Fig. 1. The resistor 44 limits the current drawn when the coil 41 is short circuited.

If the trolley bus should be preparing to make a turn, the current collectors will occupy a position such as shown at 18a and 18b in Fig. 1. The auxiliary contact member 15a will therefore be energized first. Coil 41 will be energized from auxiliary contact member 15a, through resistor 44, conductor 45, coil 41, to line 12b, and relay 40 will operate to open its normally closed contact members 40a and 40b, and close normally open contact members 40c. The "turn" coils of the trolley frogs will therefore be energized from auxiliary contact member 15a, conductor 43, conductor 46, normally open contact members 40c, conductor 35, and as shown in Fig. 1 for the turn position. Since the trolley frog operating coils are both energized from the contact 15a, there will be no further operation when the trailing current collector 18b traverses the auxiliary line contact member 15b.

It can, therefore, be seen that I have not only disclosed a new and novel method of automatically operating the trolley frogs in a trolley bus system that is simple and effective, but have also, by relieving the operator of a trolley bus from additional duties, such as having to maintain the controller in a predetermined position while guiding the bus through an intersection, added greatly to the safety and convenience of the trolley bus passengers.

Since certain changes may be made in the above description and different embodiments of the invention may be made without departing from the spirit thereof, it is intended that all matter disclosed in the above description or shown in the accompanying drawing shall be considered as illustrative and not in a limiting sense.

I claim as my invention:

1. In a switching system for a pair of current collectors mounted on a vehicle, a pair of main trolley wires of opposite polarity and a branch wire for each main wire, a trolley frog at the intersection of each main and branch wire having a movable tongue for guiding a current collector on the vehicle either along the main wire or on to the branch wire depending on the position of the said movable tongue, means including a pair of operating coils associated with each frog for actuating its tongue in opposite directions, a single contact device located adjacent each main wire on the approach side of each frog so as to be electrically connected to its respective associated trolley wire during the passage of one of said current collectors therealong, and a relay selectively controlled by the engagement of the current collectors on the vehicle with the said contact devices dependent upon whether the current collectors both engage the contact devices at the same time or one in advance of the other and cooperative with one of said contact devices for selectively energizing the operating coils of the frogs, said order of engagement of the current collectors with the contact devices being dependent upon the angular position of the vehicle with respect to the main trolley wires.

2. In a switching system for a pair of current collectors mounted on a vehicle, a pair of main trolley wires of opposite polarity and a branch wire for each main wire, a trolley frog at the intersection of each main and branch wire having a movable tongue for guiding a current collector on the vehicle either along the main wire or on to the branch wire depending on the position of the said movable tongue, electro-magnetic means for actuating the frogs in opposite directions, a single contact device located adjacent each main wire on the approach side of the frog so as to be electrically connected with its associated wire during the passage of one of said current collectors therealong, a single relay for selectively controlling in conjunction with one of said contact devices the energization of the electro-magnetic actuating means for the frogs, said relay being selectively controlled by the engagement of the said current collectors with said contact devices, whereby the movable tongues are actuated in one predetermined direction when one of said contact devices is engaged by its associated current collector before the other contact device is engaged by the other current collector and in the other predetermined direction when the contact devices are engaged by the said current collectors substantially simultaneously.

3. In a control system for a pair of electrically operated trolley frogs the combination, of a pair of main trolley wires of opposite polarity and a branch wire for each main wire, a trolley frog located at the intersection of each main wire and branch wire having a movable tongue for guiding a current collector of a vehicle either along the main wire or onto the branch wire and means including a pair of operating coils energizable to actuate the movable tongue in opposite directions, a single contact device located adjacent to each main wire on the approach side of the frog so as to be electrically connected to the main trolley wire during the passage of its associated current collector, an energizing circuit for the operating coils connected to one of the main trolley wires and to the contact device associated with the other main trolley wire, and a single relay for controlling the said energizing circuit to selectively effect actuation of the movable tongue members in opposite directions dependent upon the position of the relay, said relay having a main winding for operating the relay to effect actuation of the movable tongues in a predetermined direction when the current collector associated with the said one contact member is longitudinally in advance of the other current collector as they pass the contact devices, and a differential winding for preventing operation of the relay when both of the current collectors are substantially abreast of each other as they pass the contact devices so as to effect actuation of the movable tongues in the opposite direction, and means for rendering the differential winding ineffective upon operation of the relay.

4. In a switching system for a pair of current collectors mounted on a vehicle, a pair of main trolley wires of opposite polarity and a branch wire for each main wire, a trolley frog at the intersection of each main and branch wire having a movable tongue for guiding a current collector on the vehicle either along the main wire or on to the branch wire depending on the position of the said movable tongue, means including a pair of operating coils associated with each frog for actuating its tongue in opposite directions, a single contact device located adjacent each main wire on the approach side of the frog so as to be electrically connected to its respective associated trolley wire during the passage of one of said current collectors therealong, an energizing circuit for said operating coils connected to one of the main trolley wires and the contact device associated with the other main trolley wire, a relay for selectively controlling said energizing circuit, whereby the movable tongues of the frogs are actuated to their different positions when the said one contact device is engaged by its associated current collector dependent upon the position of the relay, said relay being selectively controlled by energization from both of said contact devices, whereby said relay functions to control the energizing circuit for the operating coils of the frogs to operate the movable tongue members thereof to one position when the said one contact device is engaged by its associated current collector before the other contact device is engaged by its associated current collector and to the other position when said contact devices are engaged by their associated current collectors substantially simultaneously.

5. A control system for a pair of current collectors mounted on a vehicle comprising, a pair of main trolley wires of opposite polarity and a branch wire for each main wire, a trolley frog located at the intersection of each main wire and its branch wire having a movable tongue for guiding one of said current collectors either along the main wire or onto the branch wire, means including a pair of operating coils associated with each trolley frog for actuating the movable tongue in opposite directions, a single contact device located adjacent to each main wire on the approach side of the frog so as to be electrically connected to its respective trolley wire during engagement by one of said current collectors, circuit means for energizing the operating coils of the trolley frogs from one of the contact devices, and relay means for controlling the circuit means to selectively effect actuation of the movable tongues in opposite directions dependent upon whether the current collectors engage their respective associated contact devices simultaneously or one in advance of the other, said relay having an operating winding connected to the aforesaid one contact device for operating the relay to effect the energization of one operating coil of each trolley frog to actuate the movable tongues in a predetermined direction when the said one contact device is engaged by its current collector before the other contact device is engaged by its associated current collector, and a differential winding disposed to be energized from the said other contact device to prevent operation of the relay and effect energization of the other operating coil of each trolley frog to actuate the movable tongues in the opposite direction when both current collectors engage their respective contact devices substantially simultaneously.

6. In a switching system for a pair of current collectors mounted on a vehicle, a pair of main trolley wires of opposite polarity and a branch wire for each main wire, an electrically operated trolley frog located at the intersection of each main wire and branch wire having a movable tongue for guiding a current collector either along the main wire or onto the branch wire and means including a pair of operating coils for moving the tongue in opposite directions, a single contact device positioned adjacent to each main wire on the approach side of the drog so as to be electrically connected to the main wire during engagement by a passing current collector, an energizing circuit for the operating coils connected to one of the main trolley wires and to the contact device associated with the other main trolley wire, a relay for controlling the energizing circuit to effect selective energization of the operating coils to actuate the movable tongue in opposite directions dependent on the relative longitudinal position of the current collectors to each other on the main wires as they pass the contact devices, said relay having an operating winding connected to the one contact device so as to be energized therefrom only during the engagement therewith of the associated current collector to actuate the relay and effect actuation of the movable tongues in a predetermined direction when the current collector associated with the said one contact device is longitudinally in advance of the other current collector as they pass the contact devices, circuit means associated with the other contact device effective to prevent actuation of the relay when both of the current collectors are substantially abreast of each other as they pass the contact devices so as to effect the actuation of the movable tongues in the opposite direction, and means associated with the relay for rendering said circuit means ineffective upon actuation of the relay.

7. A control system for electrically operated trolley frogs comprising, a pair of main trolley wires of opposite polarity and a branch wire for each main wire, a trolley frog located at the intersection of each main wire and its branch wire having a movable tongue for guiding a current collector mounted on a vehicle along the main wire or onto its associated branch wire, an operating mechanism including two operating coils for actuating the tongue in opposite directions, a single contact device positioned adjacent to each main wire on the approach side of the frog and disposed to be electrically connected to its associated wire during engagement by a passing current collector, circuit means connected to one of the main wires and to the contact device associated with the other main wire for energizing said operating coils only during the engagement of the said contact device by its associated current collector, relay means for controlling the circuit means to selectively energize said operating coils to actuate the movable tongues of the trolley frogs to their different positions when the said contact device is engaged by its associated current collector dependent upon the position of the relay, said relay being operable to effect the energization of one of said operating coils of each frog from the said contact device so as to effect actuation of the movable tongues in a predetermined direction when the said contact device is engaged by its current collector before the other contact device is engaged by its associated current collector, and circuit means associated with the said other contact device for preventing operation of the relay when both contact devices are simultaneously engaged by their respective current collectors, so as to effect energization of the other operating coil of each frog to actuate the tongues in the opposite direction.

8. A switching system for a pair of current collectors mounted on a vehicle comprising, a pair of main trolley wires of opposite polarity and a branch wire for each main wire, an electrically operated trolley frog located at the intersection of each main wire and its branch wire having a movable tongue member for guiding a current collector along the main wire or onto the branch wire depending on the position of the tongue member and a pair of operating coils for actuating the movable tongue member to different positions, a contact device located adjacent to each main wire on the approach side of the trolley frog so as to be electrically connected to its associated trolley wire upon engagement by a current collector, an energizing circuit for connecting said operating coils to one of the main trolley wires and the contact device associated with the other main trolley wire, a relay which functions to control the energizing circuit and selectively effect actuation of the movable tongue members to their different positions when the said one contact device is engaged by its associated current collector dependent upon the position of said relay, said relay functioning by energization from both contact devices to maintain normal connections in the energizing circuit and effect the energization of one of said operating coils of each frog to actuate the movable tongue members to one predetermined position when both of the contact devices are engaged substantially simultaneously by their associated current collectors, and to change the energizing circuit connections and effect energization of the other of said operating coils of each frog when the said one contact device is engaged by its current collector before the other contact device is engaged by its associated current collector so as to actuate the movable tongues to another predetermined position.

GRAHAM L. MOSES.

DISCLAIMER 2,157,859.—*Graham L. Moses*, Pittsburgh, Pa. CONTROL SYSTEM FOR TROLLEY FROGS. Patent dated May 9, 1939. Disclaimer filed December 19, 1940, by the assignee, *Westinghouse Electric & Manufacturing Company*.

Hereby enters this disclaimer as to claims 1, 2, and 4 of the patent.

[*Official Gazette January 21, 1941.*]